(12) United States Patent
Song et al.

(10) Patent No.: US 11,595,100 B2
(45) Date of Patent: Feb. 28, 2023

(54) APPARATUS AND METHOD FOR CONFIGURING TRANSMISSION RESOURCE OF BEAM FAILURE RECOVERY REQUEST, APPARATUS AND METHOD FOR RESPONDING BEAM FAILURE RECOVERY REQUEST AND COMMUNICATIONS SYSTEMS

(71) Applicant: FUJITSU LIMITED, Kawasaki (JP)

(72) Inventors: Lei Song, Beijing (CN); Xin Wang, Beijing (CN); Hua Zhou, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 140 days.

(21) Appl. No.: 16/704,470

(22) Filed: Dec. 5, 2019

(65) Prior Publication Data
US 2020/0106510 A1    Apr. 2, 2020

Related U.S. Application Data

(63) Continuation of application No. PCT/CN2017/088298, filed on Jun. 14, 2017.

(51) Int. Cl.
*H04B 7/06* (2006.01)
*H04W 72/04* (2009.01)
(Continued)

(52) U.S. Cl.
CPC ........ *H04B 7/0695* (2013.01); *H04W 72/046* (2013.01); *H04W 76/11* (2018.02); *H04W 76/27* (2018.02)

(58) Field of Classification Search
CPC .... H04B 7/0695; H04W 76/11; H04W 76/27; H04W 72/046
(Continued)

(56) References Cited

U.S. PATENT DOCUMENTS 10,194,442 B2 *  1/2019  Nagaraja ............ H04W 72/046
2012/0004014 A1   1/2012  Ding et al.
(Continued)

FOREIGN PATENT DOCUMENTS

CN   103582164 A   2/2014
CN   105830483 A   8/2016
(Continued)

OTHER PUBLICATIONS 62378137P (Year: 2016).*
(Continued)

*Primary Examiner* — Intekhaab A Siddiquee
(74) *Attorney, Agent, or Firm* — Myers Wolin, LLC

(57) ABSTRACT

An apparatus and method for configuring a transmission resource of a beam failure recovery request, apparatus and method for responding a beam failure recovery request, and a communications system. The apparatus for configuring a transmission resource of a beam failure recovery request includes: a configuring unit configured to transmit configuration information to user equipment, the configuration information being used to configure a transmission resource of a beam failure recovery request related to coordination network equipment. The apparatus for responding a beam failure recovery request includes: a responding unit configured to transmit response information related to a beam failure recovery request of coordination network equipment to user equipment. A case where beam failure occurs in the coordination network equipment may be dealt with efficiently, and normal communications between the network equipment and the user equipment may be ensured.

7 Claims, 10 Drawing Sheets

201 configuration information is transmitted to user equipment, the configuration information being used to configure a transmission resource of a beam failure recovery request related to coordination network equipment

(51) Int. Cl.
*H04W 76/11* (2018.01)
*H04W 76/27* (2018.01)
(58) Field of Classification Search
USPC .......................................................... 370/329
See application file for complete search history.

(56) References Cited

U.S. PATENT DOCUMENTS

| | | | |
|---|---|---|---|
| 2017/0150487 A1 | 5/2017 | Zhou et al. | |
| 2017/0195998 A1 | 7/2017 | Zhang et al. | |
| 2018/0054830 A1* | 2/2018 | Luo | H04W 24/10 |
| 2018/0279287 A1* | 9/2018 | John Wilson et al. | |
| | | | H04B 7/088 |

FOREIGN PATENT DOCUMENTS

| | | | |
|---|---|---|---|
| CN | 106471751 A | 3/2017 | |
| JP | 2012-520582 A | 9/2012 | |
| WO | 2016023227 A1 | 2/2016 | |
| WO | 2017/022870 A1 | 2/2017 | |
| WO | 2017/024516 A1 | 2/2017 | |
| WO | WO-2017196612 A1 * | 11/2017 | ........ H04W 56/0045 |

OTHER PUBLICATIONS 62447534P (Year: 2017).*
62457704P (Year: 2017).*
R2-1704532 (Year: 2017).*
Extended European search report with supplementary European search report and the European search opinion Issued by the European Patent Office for corresponding European Patent Application No. 17913215.4-1231, dated Dec. 7, 2020.
Notice of Reasons for Refusal issued by the Japan Patent Office for corresponding Japanese Patent Application No. 2019-566719, dated Dec. 8, 2020, with an English translation.
Mediatek Inc., "Discussion on Beam Recovery Mechanism", Agenda Item: 7.1.2.2.2, 3GPP TSG RAN WG1 Meeting #89, R1-1707832, Hangzhou, China, May 15-19, 2017.
International Search Report and Written Opinion of the International Searching Authority issued for corresponding International Patent Application No. PCT/CN2017/088298, dated Jan. 3, 2018, with an English translation.
Fujitsu, "Discussion on beam failure recovery procedure", Agenda Item: 7.1.2.2.2, 3GPP TSG-RAN WG1 Meeting #89, R1-1707255, Hangzhou, P. R. China, May 15 -19, 2017.
LG Electronics, "Discussion on cooperative transmission", Agenda Item: 7.1.2.1.7, 3GPP TSG-RAN WG1 Meeting #8 9, R1-1707603, Hangzhou, P. R. China, May 15-19, 2017.
Notice of Reasons for Refusal issued by the Japan Patent Office for corresponding Japanese Patent Application No. 2019-566719, dated Mar. 30, 2021, with an English translation.
Communication pursuant to Article 94(3) EPC issued by the European Patent Office for corresponding European Patent Application No. 17 913 215.4-1215, dated Apr. 29, 2022.
Fujitsu, "Discussion on beam failure recovery procedure", Agenda Item: 8.1.2.2.2, 3GPP TSG-RAN WG1 Meeting #88bis, R1-1704478, Spokane, USA, Apr. 3-7, 2017.
Samsung, "NR beam recovery procedure", Agenda Item: 10.2.3.4, 3GPP TSG-RAN WG2 2017 RAN2 #97bis Meeting, R2-1703712, Spokane, USA, Apr. 3-7, 2017.
Samsung, "NR beam recovery", Agenda Item: 10.2.9, 3GPP TSG-RAN WG2 2017 RAN2 #98 Meeting, R2-1705731, Hangzhou, China, May 15-19, 2017.
NTT Docomo, Inc., "Further views on mechanism to recover from beam failure", Agenda Item: 7.1.2.2.2, 3GPP TSG-RAN WG1 Meeting #89, R1-1708452, Hangzhou, P.R. China, May 15-19, 2017.
First Notification of Office Action and Search Report issued by the China National Intellectual Property Administration or corresponding Chinese Patent Application No. 201780091038.6, dated Oct. 25, 2022, with an English translation.

* cited by examiner configuration information is transmitted to user equipment, the configuration information being used to configure a transmission resource of a beam failure recovery request related to coordination network equipment — 201

APPARATUS AND METHOD FOR CONFIGURING TRANSMISSION RESOURCE OF BEAM FAILURE RECOVERY REQUEST, APPARATUS AND METHOD FOR RESPONDING BEAM FAILURE RECOVERY REQUEST AND COMMUNICATIONS SYSTEMS

CROSS REFERENCE TO RELATED APPLICATIONS

This application is a continuation application of International Application No. PCT/CN2017/088298, filed on Jun. 14, 2017, the contents of which are incorporated herein by reference.

TECHNICAL FIELD

This disclosure relates to the field of information technologies, and in particular to an apparatus and method for configuring a transmission resource of a beam failure recovery request, apparatus and method for responding a beam failure recovery request, and a communications system.

BACKGROUND

Massive multiple-input multiple-output (MIMO) technology is a key technology in a new radio (NR) system, which includes studies of the frequency bands below 6 GHz and above 6 GHz. With the increase of the transmission frequency bands, the fading and loss in the transmission will increase accordingly, and a beamforming technique becomes a key technique in the massive MIMO as it may effectively compensate for the fading.

At present, the beamforming technique includes analog beamforming (ABF), digital beamforming (DBF), and analog-digital hybrid beamforming (HBF). In the ABF, beamforming is performed on an analog domain, which is less complex to implement than the DBF, but beamforming factors over the entire time domain symbols are identical. When the number of users is relatively large, the ABF may impose certain restrictions on scheduling or user performance. In the DBF, the beamforming is performed on a digital domain, and each resource element in the time-frequency domain may adjust the beamforming factor as needed, but the complexity increases with the increase of the number of antennas, hence, it is not applicable to a massive MIMO system. And the HBF is a compromise between the ABF and the DBF in terms of performance and processing complexity, in which beamforming may be performed on both the analog and digital domains. However, the HBF is still limited to beamforming operations on the analog domain, and the amount of beams supported on each symbol is limited.

In the study of the NR, in order to improve the reliability of transmission, a beamforming technique in which multiple beams are simultaneously transmitted for a physical channel (such as a broadcast channel, a data channel, and a control channel, etc.) is allowed. However, in the multi-beam beamforming technique, there still exists a case of transmission failure, referred to as beam failure, due to a transmission characteristic of a high frequency band, rotation of a mobile station, and occlusion of an obstacle, and the like, in which case by adjusting service beams, it is possible to solve a problem of transmission failure at a physical layer and a media access control (MAC) layer. Therefore, a beam recovery mechanism is introduced in the NR: configuring physical resources for monitoring and/or pairs of beams monitored by the physical resources by the network equipment (e.g. a transmission point, TRP) for a user equipment, and the user equipment monitors a transmission state of pairs of beams of the control channel based on the configured physical resources. In a case where the user equipment (UE) detects a transmission failure of the control channel (e.g. an NR physical downlink control channel, NR-PDCCH), it may notify the network equipment (such as a transmission point) of transmission failure of a current link and/or a suggestion for new service beam pairs by transmitting an uplink signal, and the transmission point may correspondingly select new service beam pairs for the UE to recover the transmission.

It should be noted that the above description of the background is merely provided for clear and complete explanation of this disclosure and for easy understanding by those skilled in the art. And it should not be understood that the above technical solution is known to those skilled in the art as it is described in the background of this disclosure.

SUMMARY

When multiple pieces of network equipment (such as transmission points, TRPs) serve UE, the multiple pieces of network equipment may transmit identical data (such as joint transmission, JT), or may transmit different data (such as non-coherent joint transmission, NC-JT). In such a scenario, for a certain piece of UE, the UE is only connected to one piece of network equipment. For the UE, the network equipment is referred to as serving network equipment, and other network equipment is referred to as coordination network equipment. For the case where multiple pieces of network equipment transmit different data (such as NR-physical downlink shared channels, NR-PDSCHs), a transmission mechanism of multiple NR-PDCCHs is introduced into the NR, each NR-PDCCH respectively scheduling NR-PDSCHs transmitted by different network equipment.

It was found by the inventors that for a certain piece of UE, when multiple pieces of network equipment transmit different NR-PDSCHs and multiple NR-PDCCHs are transmitted on multiple pieces of network equipment, when an event of beam failure occurs in one of the pieces of network equipment, when no beam recovery or other operation is performed on the network equipment, it will result in the UE not be able to receive data of the network equipment in which the event of beam failure occurs, thereby affecting normal communications between the network equipment and the UE. An existing recovery mechanism may be used as a beam recovery mechanism of the serving network equipment. However, since the coordination network equipment is not connected to the UE, RRC signaling cannot be transmitted, and the amount of transmitted NR-PDCCH types may be limited in comparison with the serving network equipment. Hence, a beam recovery mechanism of the coordination network equipment is different from the beam recovery mechanism of the serving network equipment. Therefore, there is a need to design a beam recovery mechanism to deal with the case where beam failure occurs in the coordination network equipment.

Embodiments of this disclosure provide an apparatus and method for configuring a transmission resource of a beam failure recovery request, apparatus and method for responding a beam failure recovery request, and a communications system, in which a case where beam failure occurs in the coordination network equipment may be dealt with efficiently, and normal communications between the network equipment and the user equipment may be ensured.

According to a first aspect of the embodiments of this disclosure, there is provided an apparatus for configuring a transmission resource of a beam failure recovery request, including: a configuring unit configured to transmit configuration information to user equipment, the configuration information being used to configure a transmission resource of a beam failure recovery request related to coordination network equipment.

According to a second aspect of the embodiments of this disclosure, there is provided an apparatus for responding a beam failure recovery request, including: a responding unit configured to transmit response information related to a beam failure recovery request of coordination network equipment to user equipment.

According to a third aspect of the embodiments of this disclosure, there is provided an apparatus for processing beam failure, including: a first processing unit configured to abandon beam failure recovery, and transmit an event of beam failure and/or buffer remaining data to serving network equipment.

According to a fourth aspect of the embodiments of this disclosure, there is provided an apparatus for processing beam failure, including: a second processing unit configured to receive an event of beam failure and/or buffer remaining data from coordination network equipment, and transmit the buffer remaining data to user equipment when the buffer remaining data are received.

According to a fifth aspect of the embodiments of this disclosure, there is provided network equipment, including the apparatus as described in any one of the first to the fourth aspects of the embodiments of this disclosure.

According to a sixth aspect of the embodiments of this disclosure, there is provided a communications system, including network equipment and user equipment, the network equipment including the apparatus as described in any one of the first to the fourth aspects of the embodiments of this disclosure.

According to a seven aspect of the embodiments of this disclosure, there is provided a method for configuring a transmission resource of a beam failure recovery request, including: transmitting configuration information to user equipment, the configuration information being used to configure a transmission resource of a beam failure recovery request related to coordination network equipment.

According to an eighth aspect of the embodiments of this disclosure, there is provided a method for responding a beam failure recovery request, including: transmitting response information related to a beam failure recovery request of coordination network equipment to user equipment.

According to a ninth aspect of the embodiments of this disclosure, there is provided a method for processing beam failure, including: abandoning beam failure recovery, and transmitting an event of beam failure and/or buffer remaining data to serving network equipment.

According to a tenth aspect of the embodiments of this disclosure, there is provided a method for processing beam failure, including: receiving an event of beam failure and/or buffer remaining data from coordination network equipment, and transmitting the buffer remaining data to user equipment when the buffer remaining data are received.

According to an eleventh aspect of the embodiments of this disclosure, there is provided a computer readable program, which, when executed in an apparatus for configuring a transmission resource of a beam failure recovery request or network equipment, will cause the apparatus for configuring a transmission resource of a beam failure recovery request or the network equipment to carry out the method for configuring a transmission resource of a beam failure recovery request as described in the seventh aspect.

According to a twelfth aspect of the embodiments of this disclosure, there is provided a computer storage medium, including a computer readable program code, which will cause an apparatus for configuring a transmission resource of a beam failure recovery request or network equipment to carry out the method for configuring a transmission resource of a beam failure recovery request as described in the seventh aspect.

According to a thirteenth aspect of the embodiments of this disclosure, there is provided a computer readable program, which, when executed in an apparatus for responding a beam failure recovery request or network equipment, will cause the apparatus for responding a beam failure recovery request or the network equipment to carry out the method for responding a beam failure recovery request as described in the eighth aspect.

According to a fourteenth aspect of the embodiments of this disclosure, there is provided a computer storage medium, including a computer readable program code, which will cause an apparatus for responding a beam failure recovery request or network equipment to carry out the method for responding a beam failure recovery request as described in the eighth aspect.

According to a fifteenth aspect of the embodiments of this disclosure, there is provided a computer readable program, which, when executed in an apparatus for processing beam failure or network equipment, will cause the apparatus for processing beam failure or the network equipment to carry out the method for processing beam failure as described in the ninth or tenth aspect.

According to a sixteenth aspect of the embodiments of this disclosure, there is provided a computer storage medium, including a computer readable program code, which will cause an apparatus for processing beam failure or network equipment to carry out the method for processing beam failure as described in the ninth or tenth aspect.

An advantage of the embodiments of this disclosure exists in that a case where beam failure occurs in the coordination network equipment may be dealt with efficiently, and normal communications between the network equipment and the user equipment may be ensured.

With reference to the following description and drawings, the particular embodiments of this disclosure are disclosed in detail, and the principle of this disclosure and the manners of use are indicated. It should be understood that the scope of the embodiments of this disclosure is not limited thereto. The embodiments of this disclosure contain many alternations, modifications and equivalents within the scope of the terms of the appended claims.

Features that are described and/or illustrated with respect to one embodiment may be used in the same way or in a similar way in one or more other embodiments and/or in combination with or instead of the features of the other embodiments.

It should be emphasized that the term "comprises/comprising/includes/including" when used in this specification is taken to specify the presence of stated features, integers, steps or components but does not preclude the presence or addition of one or more other features, integers, steps, components or groups thereof.

BRIEF DESCRIPTION OF THE DRAWINGS

The drawings are included to provide further understanding of this disclosure, which constitute a part of the specification and illustrate the preferred embodiments of this disclosure, and are used for setting forth the principles of this disclosure together with the description. It is obvious that the accompanying drawings in the following description are some embodiments of this disclosure, and for those of ordinary skills in the art, other accompanying drawings may be obtained according to these accompanying drawings without making an inventive effort. In the drawings.

DETAILED DESCRIPTION

Figures 1, 2:
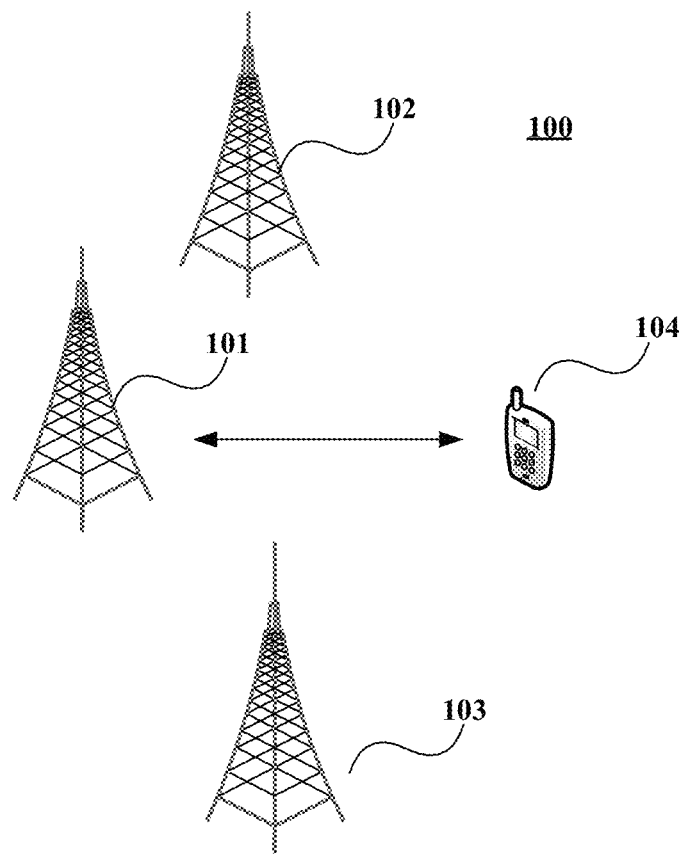
FIG. 1 is a schematic diagram of a communications system of an embodiment of this disclosure.
FIG. 2 is a flowchart of the method for configuring a transmission resource of a beam failure recovery request of Embodiment 1 of this disclosure.

These and further aspects and features of the present disclosure will be apparent with reference to the following description and attached drawings. In the description and drawings, particular embodiments of the disclosure have been disclosed in detail as being indicative of some of the ways in which the principles of the disclosure may be employed, but it is understood that the disclosure is not limited correspondingly in scope. Rather, the disclosure includes all changes, modifications and equivalents coming within the terms of the appended claims.

In the embodiments of this disclosure, terms "first", and "second", etc., are used to differentiate different elements with respect to names, and do not indicate spatial arrangement or temporal orders of these elements, and these elements should not be limited by these terms. Terms "and/or" include any one and all combinations of one or more relevantly listed terms. Terms "contain", "include" and "have" refer to existence of stated features, elements, components, or assemblies, but do not exclude existence or addition of one or more other features, elements, components, or assemblies.

In the embodiments of this disclosure, single forms "a", and "the", etc., include plural forms, and should be understood as "a kind of" or "a type of" in a broad sense, but should not defined as a meaning of "one"; and the term "the" should be understood as including both a single form and a plural form, except specified otherwise. Furthermore, the term "according to" should be understood as "at least partially according to", the term "based on" should be understood as "at least partially based on", except specified otherwise.

In the embodiments of this disclosure, the term "communications network" or "wireless communications network" may refer to a network satisfying any one of the following communications standards: long term evolution (LTE), long term evolution-advanced (LTE-A), wideband code division multiple access (WCDMA), and high-speed packet access (HSPA), etc.

And communications between devices in a communications system may be performed according to communications protocols at any stage, which may, for example, include but not limited to the following communications protocols: 1G (generation), 2G, 2.5G, 2.75G, 3G, 4G, 4.5G, and 5G and new radio (NR) in the future, etc., and/or other communications protocols that are currently known or will be developed in the future.

In the embodiments of this disclosure, the term "network equipment", for example, refers to equipment in a communications system that accesses terminal equipment to the communications network and provides services for the terminal equipment. The network equipment may include but not limited to the following equipment: a base station (BS), an access point (AP), a transmission reception point (TRP), a broadcast transmitter, a mobile management entity (MME), a gateway, a server, a radio network controller (RNC), a base station controller (BSC), etc.

The base station may include but not limited to a node B (NodeB or NB), an evolved node B (eNodeB or eNB), and a 5G base station (gNB), etc. Furthermore, it may include a remote radio head (RRH), a remote radio unit (RRU), a relay, or a low-power node (such as a femto, and a pico). The term "base station" may include some or all of its functions, and each base station may provide communications coverage for a specific geographical area. And a term "cell" may refer to a base station and/or its coverage area, which is dependent on a context of the term.

In the embodiments of this disclosure, the term "user equipment (UE)" or "terminal equipment (TE)" refers to, for example, equipment accessing to a communications network and receiving network services via a network device. The user equipment may be fixed or mobile, and may also be referred to as a mobile station (MS), a terminal, a subscriber station (SS), an access terminal (AT), or a station, etc.

The user equipment may include but not limited to the following devices: a cellular phone, a personal digital assistant (PDA), a wireless modem, a wireless communications device, a hand-held device, a machine-type communications device, a lap-top, a cordless telephone, a smart cell phone, a smart watch, and a digital camera, etc.

For another example, in a scenario of the Internet of Things (IoT), etc., the user equipment may also be a machine or a device performing monitoring or measurement. For example, it may include but not limited to a machine-type communications (MTC) terminal, a vehicle mounted communications terminal, a device to device (D2D) terminal, and a machine to machine (M2M) terminal, etc.

A control channel (CCH) is used for transmitting control signaling; wherein a physical downlink control channel (PDCCH) is one of the common control channels, which is used to carry scheduling and other control information. In the embodiments of this disclosure, description shall be given by taking a PDCCH in an NR system (NR-PDCCH) as an example; however, the embodiments of this disclosure are not limited thereto.

A data channel is used to transmit data; wherein a physical downlink shared channel (PDSCH) is one of common channels, which is used for carrying communications data. In the embodiments of this disclosure, description shall be given by taking a PDSCH in an NR system (NR-PDSCH) as an example; however, the embodiments of this disclosure are not limited thereto.

Scenarios in the embodiments of this disclosure shall be described below by way of examples; however, this disclosure is not limited thereto.

In the embodiments of this disclosure, serving network equipment and coordination network equipment are in terms of a certain piece of user equipment. For example, when there are multiple pieces of user equipment in a communications system, a certain piece of network equipment is serving network equipment for one of the pieces of user equipment, and may be coordination network equipment for other pieces of user equipment.

FIG. 1 is a schematic diagram of a communications system of an embodiment of this disclosure, in which a case where user equipment and network equipment are taken as examples is schematically shown. As shown in FIG. 1, a communications system 100 may include multiple pieces of network equipment 101, 102 and 103 and user equipment 104. FIG. 1 schematically gives an example where the amount of pieces of the network equipment is three and the amount of pieces of the user equipment is one; however, the network equipment may be of other numbers, and user equipment may be multiple pieces, the number of which being set according to actual requirements. For the user equipment 104, the multiple pieces of network equipment include serving network equipment 101 and coordination network equipment 102 and 103, the user equipment 104 is connected to the serving network equipment 101 only, and the multiple pieces of network equipment 101, 102 and 103 respectively transmit different NR-PDSCHs to the user equipment 104 via multiple NR-PDCCHs, and each NR-PDCCH respectively schedules NR-PDSCHs transmitted by different pieces of the network equipment.

In the embodiment of this disclosure, existing traffics or traffics that may be implemented in the future may be performed between the serving network equipment 101 and the user equipment 104. For example, such traffics may include but not limited to an enhanced mobile broadband (eMBB), massive machine type communications (MTC), and ultra-reliable and low-latency communications (URLLC).

Embodiment 1

The embodiment of this disclosure provides a method for configuring a transmission resource of a beam failure recovery request, applicable to a network equipment side. FIG. 2 is a flowchart of the method for configuring a transmission resource of a beam failure recovery request of Embodiment 1 of this disclosure. As shown in FIG. 2, the method includes:

Step 201: configuration information is transmitted to user equipment, the configuration information being used to configure a transmission resource of a beam failure recovery request related to coordination network equipment.

In this embodiment, transmitting the configuration information to the user equipment may be performed when communications between the network equipment and the user equipment begins, that is, the resource for transmitting the beam failure recovery request is configured for the user equipment at the beginning of the communications. In this embodiment, for a certain piece of user equipment, step 201 may be executed by a coordination network equipment or by a serving network equipment. Executing step 201 by the coordination network equipment and executing step 201 by the serving network equipment shall be described below respectively.

First, the case where the coordination network equipment executes step 201 shall be described.

In step 201, when the user equipment is used as the coordination network equipment, the configuration information may be transmitted to the user equipment via a system information block (SIB) or remaining minimum system information (RMSI) of the coordination network equipment. For example, the configuration information may be transmitted via the SIB or RMSI of the coordination network equipment in which the beam failure occurs, and the configuration information may be transmitted together with configuration information on the transmission resource of the beam failure recovery request of user equipment connected to the coordination network equipment and/or configuration information on a transmission resource of a random access preamble.

In step 201, the coordination network equipment may transmit the configuration information via the system information block or the remaining minimum system information to the user equipment establishing communications with the coordination network equipment and not connected to the coordination network equipment, or transmit the configuration information via the system information block or the remaining minimum system information of the coordination network equipment to user equipment establishing communications with the coordination network equipment and not connected to the coordination network equipment and user equipment connected to the coordination network equipment. That is, the configuration information may be used to configure a transmission resource of a beam failure recovery request of user equipment establishing communications with the coordination network equipment and not connected to the coordination network equipment, and may also be used to jointly configure a transmission resource of a beam failure recovery request of user equipment connected to the coordination network equipment. In this embodiment, before step 201, the serving network equipment may transmit at least one of cell ID information of the coordination network equipment, internal ID information of a coordination set of the coordination network equipment, global ID information of the coordination network equipment, beam pair link ID information of the coordination network equipment, and other related ID information of the coordination network equipment to the user equipment.

In this embodiment, the coordination network equipment refers to coordination network equipment in which beam failure occurs, the cell ID information is, for example, a cell number of a cell where the coordination network equipment is located, the global ID information of the coordination network equipment is, for example, a global number of the coordination network equipment, the internal ID information of a coordination set of the coordination network equipment is, for example, a network equipment number in a coordination network equipment set, and the other ID information may be, for example, ID information implicitly indicating the coordination network equipment, such as a time domain transmission resource number to which the coordination network equipment in transmission corresponds, or a frequency domain transmission resource number, or the like.

In this embodiment, the serving network equipment transmits at least one of the cell ID information of the coordination network equipment, the internal ID information of a coordination set of the coordination network equipment, the global ID information of the coordination network equipment, the beam pair link ID information of the coordination network equipment, and the other related ID information of the coordination network equipment to the user equipment, so that the user equipment may decode the SIB or the RMSI of the coordination network equipment. For example, the coordination network equipment transmits the ID information to the user equipment via broadcast signaling (MIB or SIB) or RRC signaling, and the user equipment may use the ID information to decode a master information block (MIB) of a cell where the coordination network equipment is located to obtain scheduling information on SIB/RMSI, and decode NR-PDCCHs needed by the SIB/RMSI. For example, the user equipment may use the cell ID to scramble the NR-PDCCH and NR-PDSCH, and learn from the ID information of the coordination network equipment which coordination network equipment needs to be performed beam failure recovery.

In this embodiment, after decoding the SIB or RMSI of the coordination network equipment, the user equipment may obtain the configuration information of the transmission resource used for configuring the beam failure recovery request information in the SIB or the RMSI, and the user equipment may use a random access preamble sequence and transmit the beam failure recovery request information on a non-contention channel of a physical random access channel (PRACH).

Next, the case where the serving network equipment executes step 201 shall be described.

In step 201, when the user equipment is used as the serving network equipment, the configuration information may be transmitted to the user equipment via signaling of a radio resource control (RRC) layer of the serving network equipment.

In step 201, the configuration information may be transmitted to specific user equipment. For example, the configuration information is transmitted to the user equipment connected to the serving network equipment, such as transmitting the configuration information to user equipment connected to the serving network equipment and having an identical set of coordination network equipment.

In this embodiment, the configuration information may include transmission resource configuration of the transmission beam failure recovery request information when beam failure occurs respectively in relevant serving network equipment and coordination network equipment of specific user equipment, for example, the configuration information includes transmission resource configuration of the transmission beam failure recovery request when beam failure occurs respectively in the serving network equipment and coordination network equipment of the user equipment connected to the serving network equipment. Transmission schemes adopted by the pieces of user equipment may be different, such as a service scheme of single network equipment, and a service scheme of multiple pieces of network equipment; and furthermore, the sets of coordination network equipment may possibly be different.

In this embodiment, the configuration information may include not only the configuration of the transmission resource corresponding to the beam recovery request information of the coordination network equipment where the beam failure occurs, but also configuration of a transmission resource of beam recovery request information when beam failure occurs in the serving network equipment itself. That is, the configuration information may include configuration of transmission resources corresponding to beam recovery request information of all network equipment in communications with the user equipment.

In this embodiment, there may exist multiple resources for transmitting the beam recovery request in the configuration information, and after receiving the configuration information, the user equipment may randomly select one or more transmission resources from the configured transmission resources to transmit the beam recovery request information when beam failure occurs.

In this embodiment, the serving network equipment may also perform some other configuration in configuring the resource for transmitting the beam recovery request for the user equipment. For example, quasi-co-location hypothesis configuration information related to the NR-PDCCHs and/or physical resource configuration information of a control resource set (CORESET) of the NR-PDCCHs, etc., of the serving network equipment and the coordination network equipment may also be transmitted. Such information may be used, for example, to detect events of beam failure. For example, in order to differentiate the NR-PDCCH configuration information of the serving network equipment and the coordination network equipment, the quasi-co-location hypothesis configuration information and/or the physical resource configuration information of the control resource set of the NR-PDCCHs may be configured in a grouping form, with only a group number being known to the user equipment; and the ID information of the serving network equipment and the coordination network equipment may be added into the user equipment to differentiate the configurations of the multiple NR-PDCCHs when the above information is configured.

It can be seen from the above embodiment that with the embodiment of this disclosure, a case where beam failure occurs in the coordination network equipment may be dealt with efficiently, and normal communications between the network equipment and the user equipment may be ensured.

Embodiment 2

The embodiment of this disclosure provides a method for configuring a transmission resource of a beam failure recovery request, which is applicable to a network equipment side and a user equipment side, and corresponds to the processing at the coordination network equipment side in Embodiment 1, with contents identical to those in Embodiment 1 being not going to be described herein any further.

Figure 3:
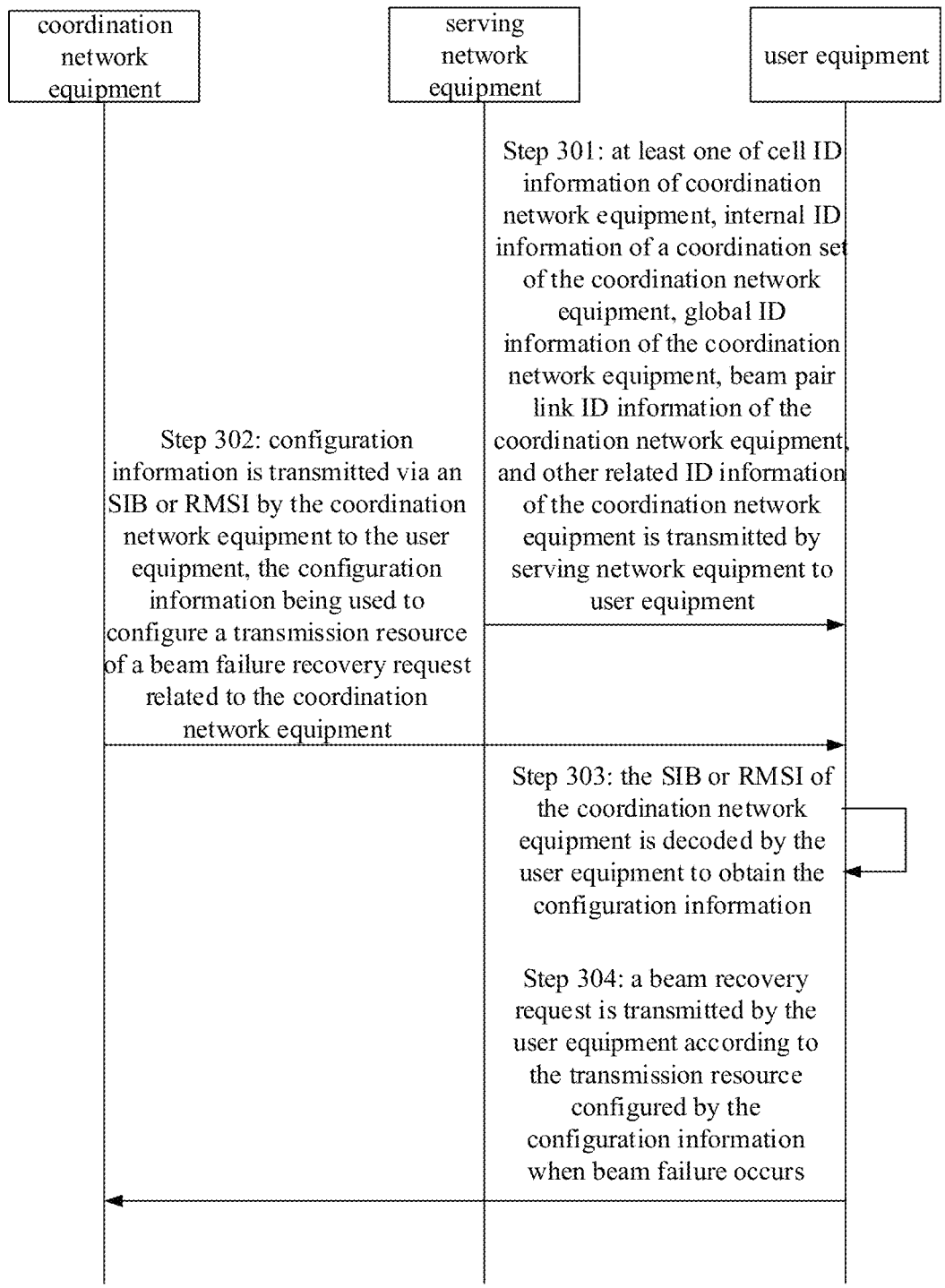
FIG. 3 is a flowchart of the method for configuring a transmission resource of a beam failure recovery request of Embodiment 2 of this disclosure.

FIG. 3 is a flowchart of the method for configuring a transmission resource of a beam failure recovery request of Embodiment 2 of this disclosure. As shown in FIG. 3, the method includes:

Step 301: at least one of cell ID information of coordination network equipment, internal ID information of a coordination set of the coordination network equipment, global ID information of the coordination network equipment, beam pair link ID information of the coordination network equipment, and other related ID information of the coordination network equipment is transmitted by serving network equipment to user equipment;

Step 302: configuration information is transmitted via an SIB or RMSI by the coordination network equipment to the user equipment, the configuration information being used to configure a transmission resource of a beam failure recovery request related to the coordination network equipment;

Step 303: the SIB or RMSI of the coordination network equipment is decoded by the user equipment to obtain the configuration information; and Step 304: a beam recovery request is transmitted by the user equipment according to the transmission resource configured by the configuration information when beam failure occurs.

It can be seen from the above embodiment that with the embodiment of this disclosure, a case where beam failure occurs in the coordination network equipment may be dealt with efficiently, and normal communications between the network equipment and the user equipment may be ensured.

Embodiment 3

The embodiment of this disclosure provides a method for configuring a transmission resource of a beam failure recovery request, which is applicable to a network equipment side and a user equipment side, and corresponds to the processing at the serving network equipment side in Embodiment 1, with contents identical to those in Embodiment 1 being not going to be described herein any further.

Figure 4:
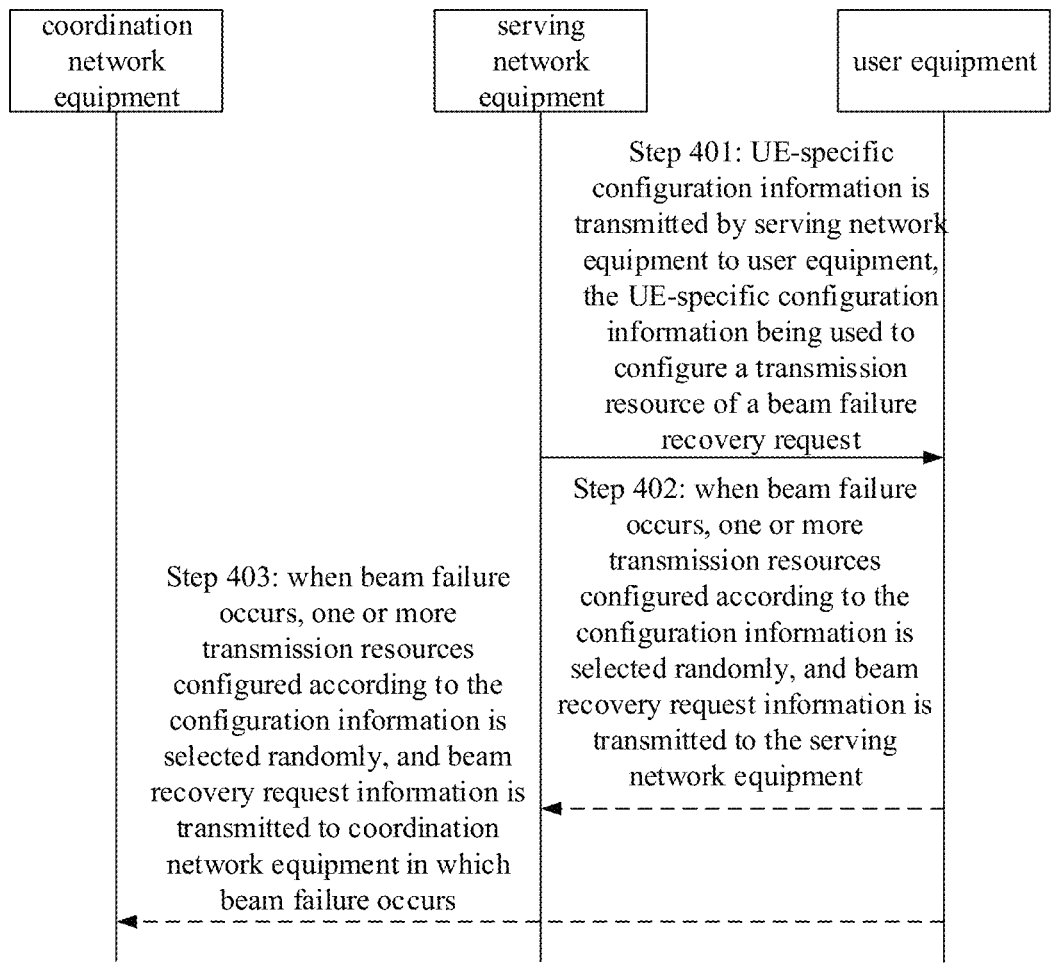
FIG. 4 is a flowchart of the method for configuring a transmission resource of a beam failure recovery request of Embodiment 3 of this disclosure.

FIG. 4 is a flowchart of the method for configuring a transmission resource of a beam failure recovery request of Embodiment 3 of this disclosure. As shown in FIG. 4, the method includes:

Step 401: UE-specific configuration information is transmitted by serving network equipment to user equipment, the UE-specific configuration information being used to configure a transmission resource of a beam failure recovery request; and Step 402: when beam failure occurs, one or more transmission resources configured according to the configuration information is selected randomly, and beam recovery request information is transmitted to the serving network equipment; or Step 403: when beam failure occurs, one or more transmission resources configured according to the configuration information is selected randomly, and beam recovery request information is transmitted to coordination network equipment in which beam failure occurs.

It can be seen from the above embodiment that with the embodiment of this disclosure, a case where beam failure occurs in the coordination network equipment may be dealt with efficiently, and normal communications between the network equipment and the user equipment may be ensured.

Embodiment 4

Figure 5:
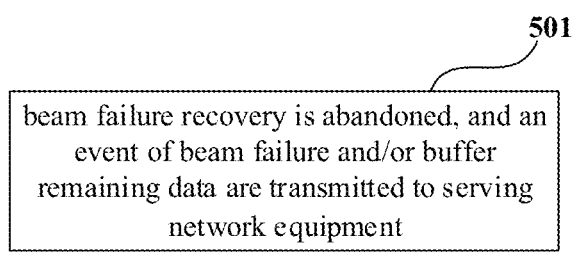
FIG. 5 is a flowchart of the method for processing beam failure of Embodiment 4 of this disclosure.

The embodiment of this disclosure provides a method for processing beam failure, applicable to a coordination network equipment side. FIG. 5 is a flowchart of the method for processing beam failure of Embodiment 4 of this disclosure. As shown in FIG. 5, the method includes:

Step 501: beam failure recovery is abandoned, and an event of beam failure and/or buffer remaining data are transmitted to serving network equipment.

In this embodiment, the coordination network equipment in which beam failure occurs abandons beam failure recovery, and transmits the event of beam failure and/or the buffer remaining data to the serving network equipment. Hence, when the serving network equipment receives the buffer remaining data, it transmits the buffer remaining data to user equipment, thereby completing transmission of remaining data of the coordination network equipment in which beam failure occurs.

In this embodiment, whether the coordination network equipment executes step 501, that is, whether it abandons beam recovery, may be set according to an actual situation of the communications system. For example, it may be determined according to an ability of the user equipment, an ability of the coordination network equipment and a payload of the serving network equipment, and the user equipment may be configured via RRC signaling.

It can be seen from the above embodiment that with the embodiment of this disclosure, a case where beam failure occurs in the coordination network equipment may be dealt with efficiently, and normal communications between the network equipment and the user equipment may be ensured.

Embodiment 5

The embodiment of this disclosure provides a method for processing beam failure, applicable to a serving network equipment side.

Figure 6:
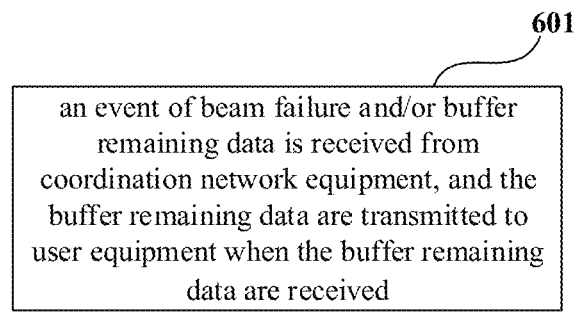
FIG. 6 is a flowchart of the method for processing beam failure of Embodiment 5 of this disclosure.

FIG. 6 is a flowchart of the method for processing beam failure of Embodiment 5 of this disclosure. As shown in FIG. 6, the method includes:

Step 601: an event of beam failure and/or buffer remaining data is received from coordination network equipment, and the buffer remaining data are transmitted to user equipment when the buffer remaining data are received.

In step 601, the serving network equipment may receive the event of beam failure and/or the buffer remaining data from the coordination network equipment, and transmit the buffer remaining data to user equipment when the buffer remaining data are received. This step, for example, corresponds to step 501 in Embodiment 4. That is, the coordination network equipment in which beam failure occurs abandons beam failure recovery, and transmits the event of beam failure and/or the buffer remaining data to the serving network equipment, and the serving network equipment receives the event of beam failure and/or the buffer remaining data from the coordination network equipment, and transmits the buffer remaining data to the user equipment when the buffer remaining data are received.

It can be seen from the above embodiment that with the embodiment of this disclosure, a case where beam failure occurs in the coordination network equipment may be dealt with efficiently, and normal communications between the network equipment and the user equipment may be ensured.

Embodiment 6

The embodiment of this disclosure provides a method for processing beam failure, which is applicable to a network equipment side and a user equipment side, and corresponds to embodiments 4 and 5, with contents identical to those in embodiments 4 and 5 being not going to be described herein any further.

Figure 7:
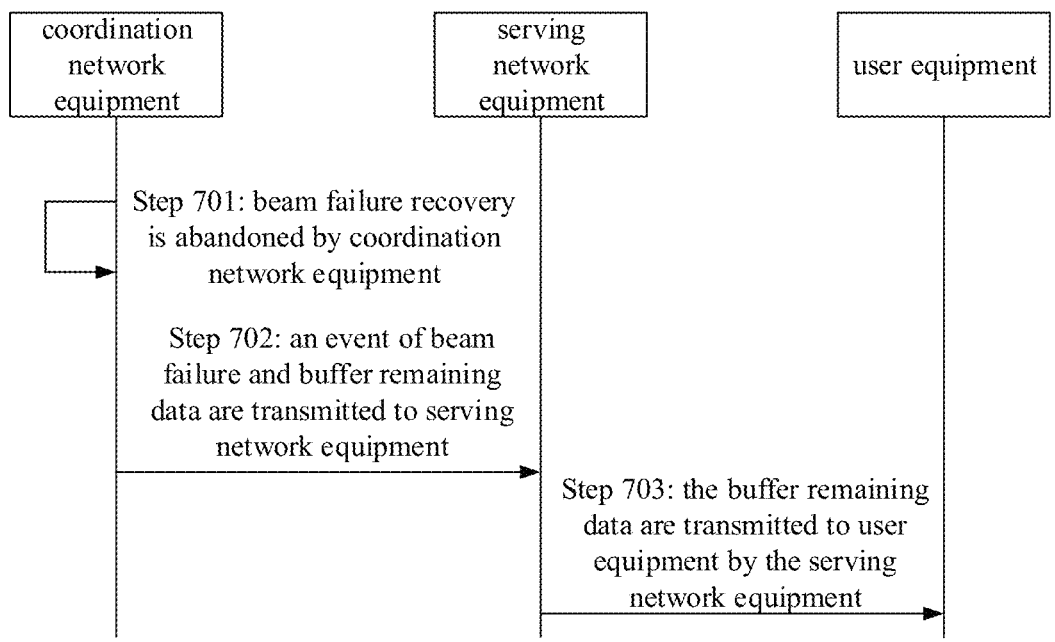
FIG. 7 is a flowchart of the method for processing beam failure of Embodiment 6 of this disclosure.

FIG. 7 is a flowchart of the method for processing beam failure of Embodiment 6 of this disclosure. As shown in FIG. 7, the method includes:

Step 701: beam failure recovery is abandoned by coordination network equipment;

Step 702: an event of beam failure and buffer remaining data are transmitted to serving network equipment; and Step 703: the buffer remaining data are transmitted to user equipment by the serving network equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 7

Figure 8:
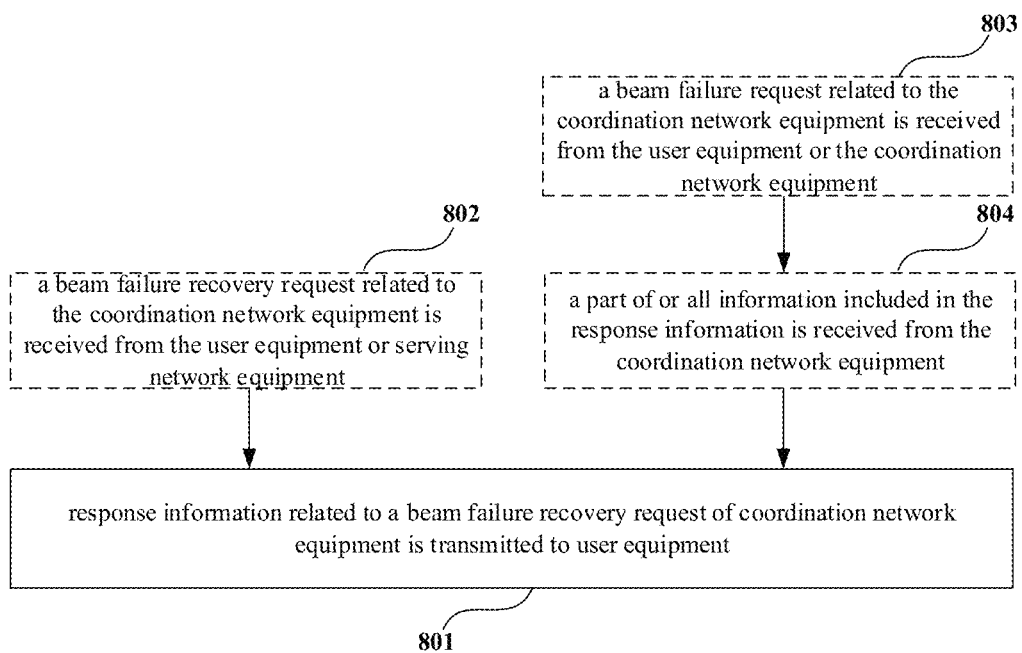
FIG. 8 is a flowchart of the method for responding a beam failure recovery request of Embodiment 7 of this disclosure.

The embodiment of this disclosure provides a method for responding a beam failure recovery request, applicable to a network equipment side. FIG. 8 is a flowchart of the method for responding a beam failure recovery request of Embodiment 7 of this disclosure. As shown in FIG. 8, the method includes:

Step 801: response information related to a beam failure recovery request of coordination network equipment is transmitted to user equipment.

In this embodiment, for a certain pieces of user equipment, step 801 may be executed by the coordination network equipment or by the serving network equipment. Executing step 801 by the coordination network equipment and executing step 801 by the serving network equipment shall be described below respectively.

First, the case where the coordination network equipment executes step 801 shall be described.

In this embodiment, for the coordination network equipment, before step 801, the method may further include:

Step 802: a beam failure recovery request related to the coordination network equipment is received from the user equipment or serving network equipment.

In this embodiment, the beam failure recovery request may be received by the coordination network equipment, or may be forwarded by the serving network equipment to the coordination network equipment after receiving the beam failure recovery request, and a manner of receiving the beam failure recovery request is not limited in this embodiment.

In step 801, a manner in which the coordination network equipment transmits the response information may be identical to or different from a manner in which the serving network equipment responds to the beam failure request.

For example, access-related information, such as a random access response or contention resolution of a contention-based random access procedure, may be included when the serving network equipment transmits the response information of the beam failure request. Hence, the response information in step 801 may include or may not include the access-related information.

In step 801, the coordination network equipment may transmit the response information by transmitting a data channel to the user equipment.

For example, the method may further include: transmitting a control channel used for scheduling the data channel to the user equipment.

For example, the coordination network equipment may transmit the response information by transmitting an NR-PDSCH to the user equipment, wherein the NR-PDSCH needs to be scheduled by transmitting an additional NR-PDCCH by the coordination network equipment, and scrambling information of CRC of the NR-PDCCH is determined by the transmission resource of the beam failure recovery request information selected by the user equipment, for example, a calculation method thereof is similar to RA-RNTI calculation in an LTE system.

Next, the case where the serving network equipment executes step 801 shall be described.

In this embodiment, for the serving network equipment, before step 801, the method may further include:

Step 803: a beam failure request related to the coordination network equipment is received from the user equipment or the coordination network equipment.

In this embodiment, the beam failure recovery request may be forwarded by the coordination network equipment to the serving network equipment after receiving the beam failure recovery request, or may be directly obtained from the user equipment, and a manner of receiving the beam failure recovery request is not limited in this embodiment.

Before step 801, the method may further include:

Step 804: a part of or all information included in the response information is received from the coordination network equipment.

For example, the response information may include at least one of cell ID information of the coordination network equipment where a beam failure event occurs, internal ID information of a coordination set of the coordination network equipment, global ID information of the coordination network equipment, beam pair link ID information of the coordination network equipment, and other related ID information of the coordination network equipment.

For example, the response information may further include a user equipment identifier (UE ID) for transmitting the beam failure request, such as a UE number, and may further include new candidate beam related information, such as a quasi-co-location hypothesis, and a beam or time-frequency resource number of a new candidate beam, etc.

In this embodiment, for example, the coordination network equipment transmits the part of or all the information included in the response information to the serving network equipment via an Xn interface.

In step 802, the response information may be transmitted to the user equipment via a data channel of the serving network equipment.

For example, the serving network equipment may transmit the response information of the beam failure request related to the coordination network equipment to the user equipment via the NR-PDSCHs. The CRC scrambling information of the NR-PDCCHs scheduling the NR-PDSCHs is determined by the transmission resource of the beam failure recovery request information selected by the user equipment, for example, a calculation method is similar to RA-RNTI calculation in an LTE system. In this embodiment, the serving network equipment transmits the response information of the beam failure request related the coordination network equipment to the user equipment, and furthermore, when beam failure occurs in the serving network equipment and the beam recovery request is received from the user equipment, the serving network equipment also needs to transmit response information of a beam failure request related the serving network equipment itself to the user equipment. In such a case, in order to differentiate above two pieces of response information, the types of response information may be divided into two types. For example, type 1 denotes the response information of a beam failure request related the serving network equipment itself, and type 2 denotes the response information of the beam failure request related the coordination network equipment.

In this embodiment, the response information of type 1 and type 2 may be defined as having different formats, or may be defined as having identical formats. Furthermore, the response information of type 1 and type 2 may be defined as having identical sizes for mutual compatibility. It is also possible that types responses are not differentiated, but a related ID of the network equipment in which an event of beam failure occurs is included in the response information, such as transmitting at least one of cell ID information of the serving network equipment or the coordination network equipment where a beam failure event occurs, the internal ID information of a coordination set of the coordination network equipment, the global ID information of the coordination network equipment, the beam pair link ID information of the coordination network equipment, and other related ID information of the coordination network equipment to the user equipment. For example, the coordination network equipment refers to coordination network equipment in which beam failure occurs, the cell ID information is, for example, a cell number of a cell where the coordination network equipment is located, the global ID information of the coordination network equipment is, for example, a global number of the coordination network equipment, the internal ID information of a coordination set of the coordination network equipment is, for example, a network equipment number in a coordination network equipment set, and the other ID information may be, for example, ID information implicitly indicating the coordination network equipment, such as a time domain transmission resource number to which the coordination network equipment in transmission corresponds, or a frequency domain transmission resource number, or the like.

In the present embodiment, the method may correspond to the processing of Embodiment 1, or may not correspond to Embodiment 1. And whether there exists a correspondence therebetween is not limited in this embodiment.

It can be seen from the above embodiment that with the embodiment of this disclosure, a case where beam failure occurs in the coordination network equipment may be dealt with efficiently, and normal communications between the network equipment and the user equipment may be ensured.

Embodiment 8

The embodiment of this disclosure provides a method for responding a beam failure recovery request, which is applicable to a network equipment side and a user equipment side, and corresponds to Embodiment 7, with contents identical to those in Embodiment 7 being not going to be described herein any further.

Figure 9:
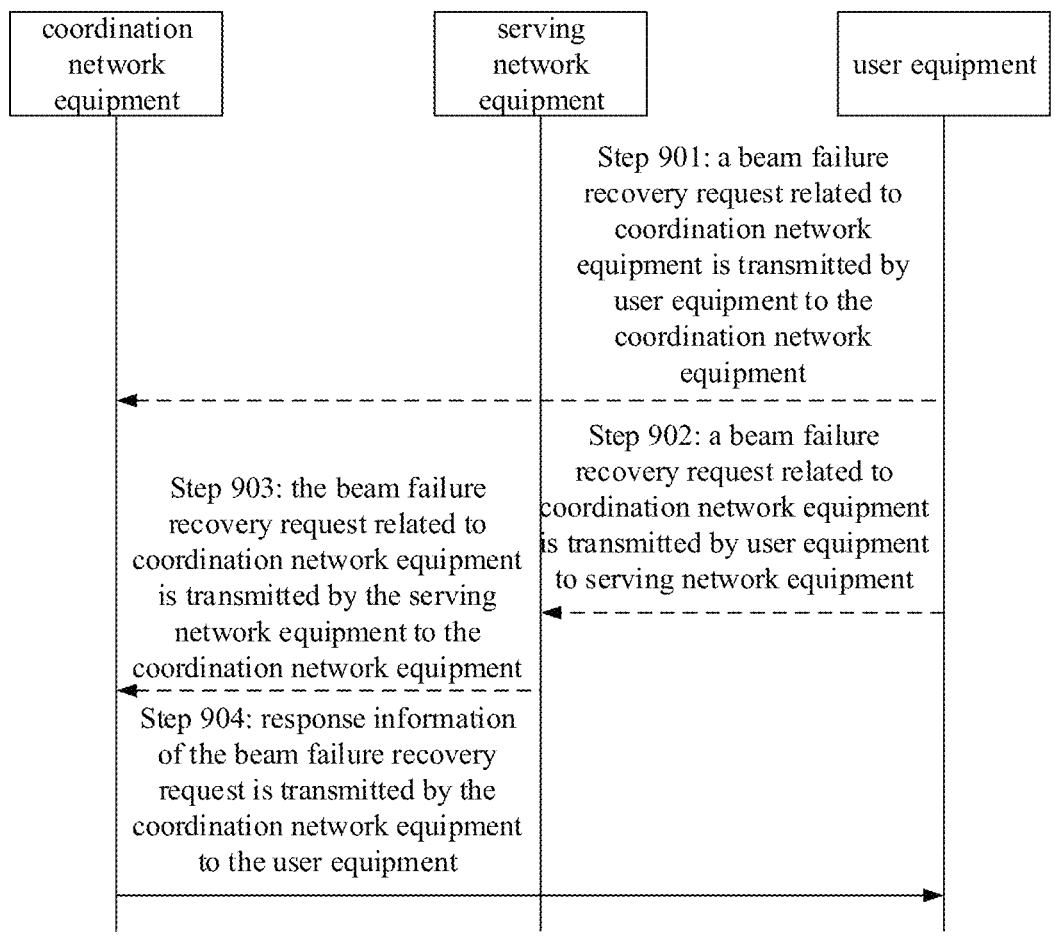
FIG. 9 is a flowchart of the method for responding a beam failure recovery request of Embodiment 8 of this disclosure.

FIG. 9 is a flowchart of the method for responding a beam failure recovery request of Embodiment 8 of this disclosure. As shown in FIG. 9, the method includes:

Step 901: a beam failure recovery request related to coordination network equipment is transmitted by user equipment to the coordination network equipment; or Step 902: a beam failure recovery request related to coordination network equipment is transmitted by user equipment to serving network equipment; and Step 903: the beam failure recovery request related to coordination network equipment is transmitted by the serving network equipment to the coordination network equipment.

After step 901, or after step 902 and step 903, the method further includes:

Step 904: response information of the beam failure recovery request is transmitted by the coordination network equipment to the user equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 9

The embodiment of this disclosure provides a method for responding a beam failure recovery request, which is applicable to a network equipment side and a user equipment side, and corresponds to Embodiment 7, with contents identical to those in Embodiment 7 being not going to be described herein any further.

Figure 10:
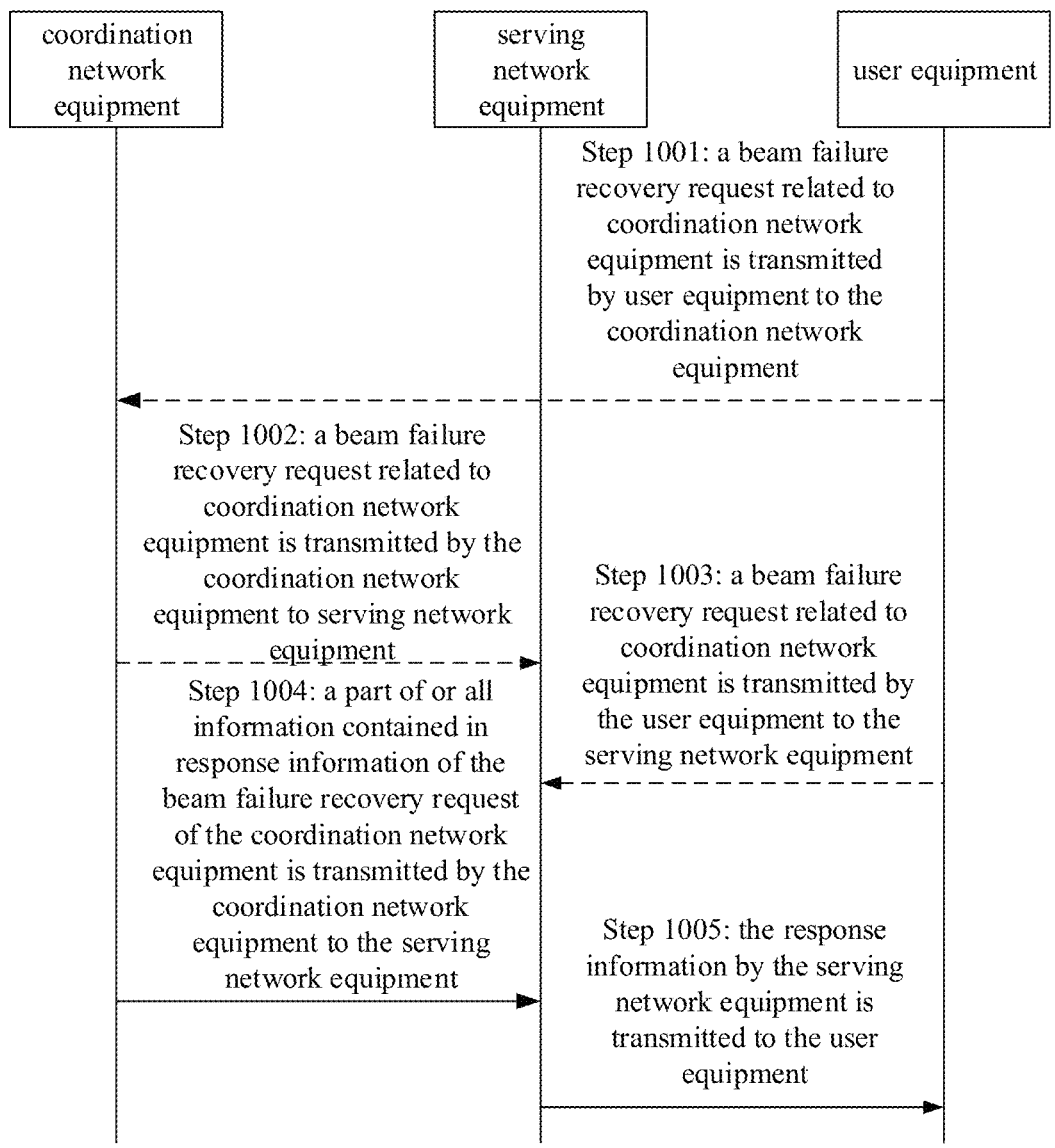
FIG. 10 is a flowchart of the method for responding a beam failure recovery request of Embodiment 9 of this disclosure.

FIG. 10 is a flowchart of the method for responding a beam failure recovery request of Embodiment 9 of this disclosure. As shown in FIG. 10, the method includes:

Step 1001: a beam failure recovery request related to coordination network equipment is transmitted by user equipment to the coordination network equipment;

Step 1002: a beam failure recovery request related to coordination network equipment is transmitted by the coordination network equipment to serving network equipment; or Step 1003: a beam failure recovery request related to coordination network equipment is transmitted by the user equipment to the serving network equipment.

After steps 1001 and 1002, or after step 1003, the method further includes:

Step 1004: a part of or all information contained in response information of the beam failure recovery request of the coordination network equipment is transmitted by the coordination network equipment to the serving network equipment; and Step 1005: the response information by the serving network equipment is transmitted to the user equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 10

The embodiment of this disclosure provides an apparatus for configuring a transmission resource of a beam failure recovery request. The apparatus corresponds to the methods for configuring a transmission resource of a beam failure recovery request described in embodiments 1-3, and reference may be made to the implementations of the methods for configuring a transmission resource of a beam failure recovery request described in embodiments 1-3 for implementation of the apparatus, with repeated parts being not going to be described herein any further.

Figure 11:
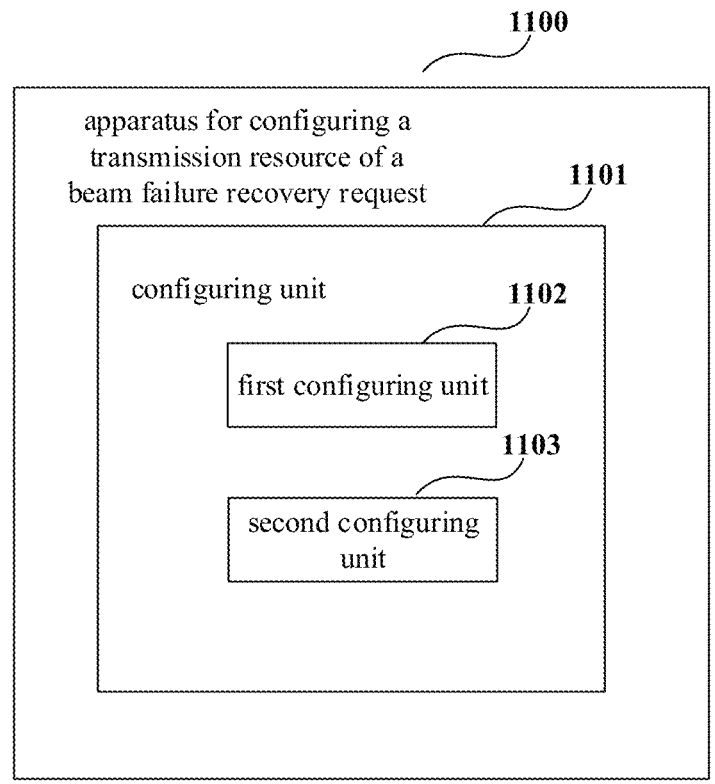
FIG. 11 is a schematic diagram of the apparatus for configuring a transmission resource of a beam failure recovery request of Embodiment 10 of this disclosure.

FIG. 11 is a schematic diagram of the apparatus for configuring a transmission resource of a beam failure recovery request of Embodiment 10 of this disclosure. As shown in FIG. 11, an apparatus 1100 includes:

a configuring unit 1101 configured to transmit configuration information to user equipment, the configuration information being used to configure a transmission resource of a beam failure recovery request related to coordination network equipment.

When network equipment where the apparatus is located is taken as coordination network equipment, the configuring unit 1101 may include:

a first configuring unit 1102 configured to transmit the configuration information via a system information block or remaining minimum system information of the coordination network equipment to the user equipment.

In this embodiment, the first configuring unit 1102 may transmit the configuration information via the system information block or the remaining minimum system information of the coordination network equipment to user equipment establishing communications with the coordination network equipment and not connected to the coordination network equipment, or may transmit the configuration information via the system information block or the remaining minimum system information of the coordination network equipment to user equipment establishing communications with the coordination network equipment and not connected to the coordination network equipment and user equipment connected to the coordination network equipment.

When the network equipment where the apparatus is located is taken as serving network equipment, the configuring unit 1101 may include:

a second configuring unit 1103 configured to transmit the configuration information via signaling of a radio resource control layer of serving network equipment to the user equipment.

In this embodiment, the second configuring unit 1103 may transmit the configuration information via the signaling of the radio resource control layer of the serving network equipment to user equipment connected to the serving network equipment.

In this embodiment, the configuration information includes transmission resource configuration of the beam failure recovery request when beam failures respectively occur in the serving network equipment and coordination network equipment of the user equipment connected to the serving network equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 11

The embodiment of this disclosure provides an apparatus for processing beam failure. The apparatus corresponds to the methods for processing beam failure described in embodiments 4 and 6, and reference may be made to the implementations of the methods for processing beam failure described in embodiments 4 and 6 for implementation of the apparatus, with repeated parts being not going to be described herein any further.

Figure 12:
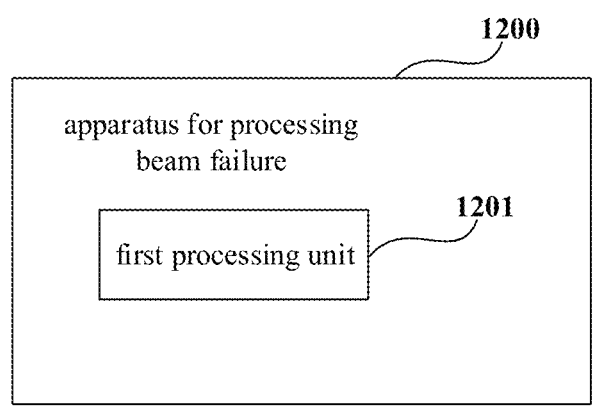
FIG. 12 is a schematic diagram of the apparatus for processing beam failure of Embodiment 11 of this disclosure.

FIG. 12 is a schematic diagram of the apparatus for processing beam failure of Embodiment 11 of this disclosure. As shown in FIG. 12, an apparatus 1200 includes:

a first processing unit 1201 configured to abandon beam failure recovery, and transmit an event of beam failure and/or buffer remaining data to serving network equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 12

The embodiment of this disclosure provides an apparatus for processing beam failure. The apparatus corresponds to the methods for processing beam failure described in embodiments 5 and 6, and reference may be made to the implementations of the methods for processing beam failure described in embodiments 5 and 6 for implementation of the apparatus, with repeated parts being not going to be described herein any further.

Figure 13:
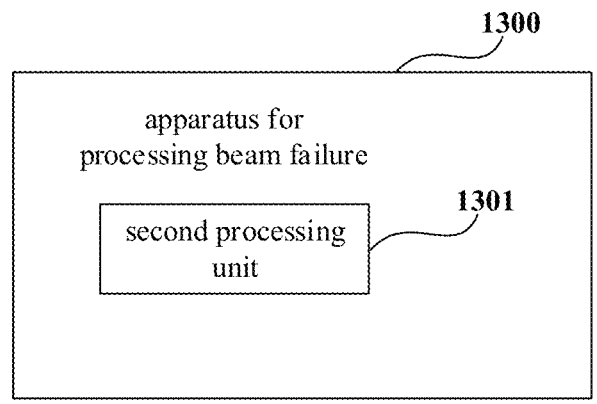
FIG. 13 is a schematic diagram of the apparatus for processing beam failure of Embodiment 12 of this disclosure.

FIG. 13 is a schematic diagram of the apparatus for processing beam failure of Embodiment 12 of this disclosure. As shown in FIG. 13, an apparatus 1300 includes:

a second processing unit 1301 configured to receive an event of beam failure and/or buffer remaining data from coordination network equipment, and transmit the buffer remaining data to user equipment when the buffer remaining data are received.

It can be seen from the above embodiment that with the embodiment of this disclosure, a case where beam failure occurs in the coordination network equipment may be dealt with efficiently, and normal communications between the network equipment and the user equipment may be ensured.

Embodiment 13

The embodiment of this disclosure provides an apparatus for responding a beam failure recovery request. The apparatus corresponds to the methods for responding a beam failure recovery request described in embodiments 7-9, and reference may be made to the implementations of the methods for responding a beam failure recovery request described in embodiments 7-9 for implementation of the apparatus, with repeated parts being not going to be described herein any further.

Figure 14:
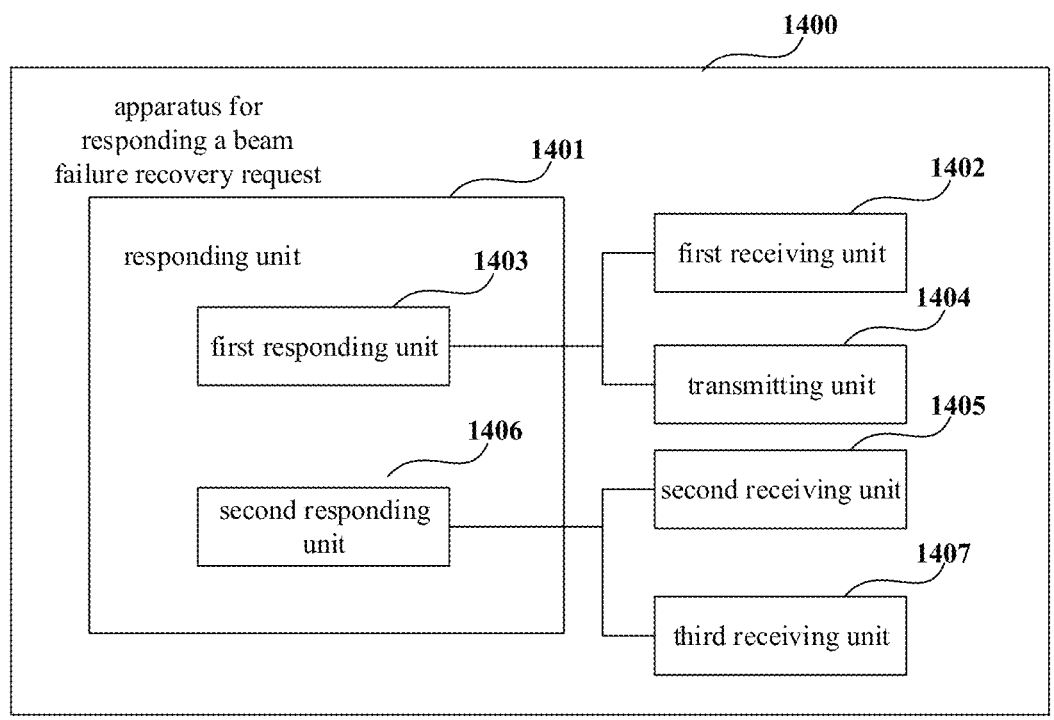
FIG. 14 is a schematic diagram of the apparatus for responding a beam failure recovery request of Embodiment 13 of this disclosure.

FIG. 14 is a schematic diagram of the apparatus for responding a beam failure recovery request of Embodiment 13 of this disclosure. As shown in FIG. 14, an apparatus 1400 includes:

a responding unit 1401 configured to transmit response information related to a beam failure recovery request of coordination network equipment to user equipment.

When network equipment where the apparatus is located is taken as coordination network equipment, the apparatus may further include:

a first receiving unit 1402 configured to receive a beam failure recovery request related to the coordination network equipment from the user equipment or serving network equipment.

In this embodiment, the responding unit 1401 may include:

a first responding unit 1403 configured to transmit the response information by transmitting a data channel to the user equipment.

In this embodiment, the apparatus may further include:

a transmitting unit 1404 configured to transmit a control channel used for scheduling the data channel to the user equipment.

In this embodiment, the response information may include or may not include access-related information.

When the network equipment where the apparatus is located is taken as serving network equipment, the apparatus may further include:

a second receiving unit 1405 configured to receive a beam failure request related to the coordination network equipment from the user equipment or the coordination network equipment.

In this embodiment, the response information may include at least one of cell ID information of the coordination network equipment where a beam failure event occurs, internal ID information of a coordination set of the coordination network equipment, global ID information of the coordination network equipment, beam pair link ID information of the coordination network equipment, and other related ID information of the coordination network equipment.

In this embodiment, the responding unit 1401 may include:

a second responding unit 1406 configured to transmit the response information to the user equipment via a data channel.

In this embodiment, the apparatus may further include:

a third receiving unit 1407 configured to receive part or all of information contained in the response information from the coordination network equipment.

It can be seen from the above embodiment that with the embodiment of this disclosure, a case where beam failure occurs in the coordination network equipment may be dealt with efficiently, and normal communications between the network equipment and the user equipment may be ensured.

Embodiment 14

The embodiment of this disclosure provides network equipment, which may include at least one of the apparatus for configuring a transmission resource of a beam failure recovery request described in Embodiment 10, the apparatus for processing beam failure described in Embodiment 11 or 12 and the apparatus for responding a beam failure recovery request described in Embodiment 13.

Figure 15:
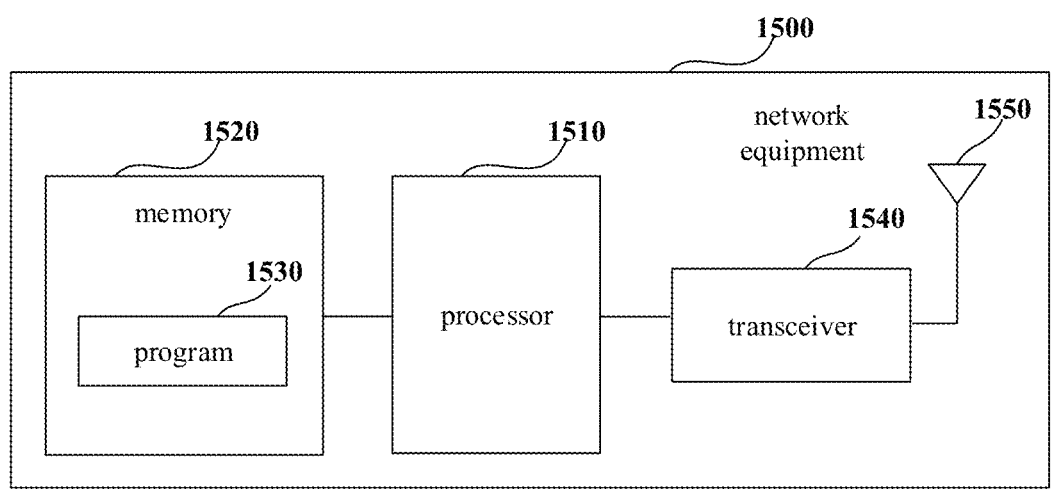
FIG. 15 is a schematic diagram of a structure of the network equipment of Embodiment 14 of this disclosure.

FIG. 15 is a schematic diagram of a structure of the network equipment of the embodiment of this disclosure. As shown in FIG. 15, a network equipment 1500 may include a processor 1510 and a memory 1520, the memory 1520 being coupled to the processor 1510. The memory 1520 may store various data, and furthermore, it may store a program 1530 for data processing, and execute the program 1530 under control of the processor 1510, so as to receive various information transmitted by user equipment, and transmit various information to the user equipment.

In one implementation, the functions of the apparatus for configuring a transmission resource of a beam failure recovery request, the apparatus for processing beam failure or the apparatus for responding a beam failure recovery request may be integrated into the processor 1510.

In this embodiment, when the functions of the apparatus for configuring a transmission resource of a beam failure recovery request are integrated into the processor 1510, the processor 1510 may be configured to: transmit configuration information to user equipment, the configuration information being used to configure a transmission resource of a beam failure recovery request related to coordination network equipment.

For example, the transmitting configuration information to user equipment, the configuration information being used to configure a transmission resource of a beam failure recovery request related to coordination network equipment, includes: transmitting the configuration information via a system information block or remaining minimum system information of the coordination network equipment to the user equipment.

For example, the transmitting the configuration information via a system information block or remaining minimum system information of the coordination network equipment to the user equipment includes: transmitting the configuration information via the system information block or the remaining minimum system information of the coordination network equipment to user equipment establishing communications with the coordination network equipment and not connected to the coordination network equipment, or transmitting the configuration information via the system information block or the remaining minimum system information of the coordination network equipment to user equipment establishing communications with the coordination network equipment and not connected to the coordination network equipment and user equipment connected to the coordination network equipment.

For example, the transmitting configuration information to user equipment, the configuration information being used to configure a transmission resource of a beam failure recovery request related to coordination network equipment, includes: transmitting the configuration information via signaling of a radio resource control layer of serving network equipment to the user equipment.

For example, the transmitting the configuration information via signaling of a radio resource control layer of serving network equipment to the user equipment includes: transmitting the configuration information via the signaling of the radio resource control layer of the serving network equipment to user equipment connected to the serving network equipment.

For example, the configuration information includes transmission resource configuration of the beam failure recovery request when beam failures respectively occur in the serving network equipment and coordination network equipment of the user equipment connected to the serving network equipment.

In this embodiment, when the functions of the apparatus for processing beam failure are integrated into the processor 1510, the processor 1510 may be configured to: abandon beam failure recovery, and transmit an event of beam failure and/or buffer remaining data to serving network equipment, or receive an event of beam failure and/or buffer remaining data from coordination network equipment, and transmit the buffer remaining data to user equipment when the buffer remaining data are received.

In this embodiment, when the functions of the apparatus for responding a beam failure recovery request are integrated into the processor 1510, the processor 1510 may be configured to: transmit response information related to a beam failure recovery request of coordination network equipment to user equipment.

For example, the processor 1510 may further be configured to: receive a beam failure recovery request related to the coordination network equipment from the user equipment or serving network equipment.

For example, the transmitting response information related to a beam failure recovery request of coordination network equipment to user equipment includes: transmitting the response information by transmitting a data channel to the user equipment.

For example, the processor 1510 may further be configured to: transmit a control channel used for scheduling the data channel to the user equipment.

For example, the response information includes or does not include access-related information.

For example, the processor 1510 may further be configured to: receive a beam failure recovery request related to the coordination network equipment from the user equipment or the coordination network equipment.

For example, the response information includes at least one of cell ID information of the coordination network equipment where a beam failure event occurs, internal ID information of a coordination set of the coordination network equipment, global ID information of the coordination network equipment, beam pair link ID information of the coordination network equipment, and other related ID information of the coordination network equipment.

For example, the transmitting response information related to a beam failure recovery request of coordination network equipment to user equipment includes: transmitting the response information to the user equipment via a data channel.

For example, the processor 1510 may further be configured to: receiving part or all of information contained in the response information from the coordination network equipment.

In another implementation, the apparatus for configuring a transmission resource of a beam failure recovery request, or the apparatus for processing beam failure, or the apparatus for responding a beam failure recovery request and the processor 1510 may be configured separately. For example, the apparatus for configuring a transmission resource of a beam failure recovery request, or the apparatus for processing beam failure, or the apparatus for responding a beam failure recovery request may be configured as a chip connected to the processor 1510, with its functions being realized under control of the processor 1510.

Furthermore, as shown in FIG. 15, the network equipment 1500 may include a transceiver 1540, and an antenna 1550, etc. Functions of the above components are similar to those in the related art, and shall not be described herein any further. It should be noted that the network equipment 1500 does not necessarily include all the parts shown in FIG. 15, and furthermore, the network equipment 1500 may include parts not shown in FIG. 15, and the related art may be referred to.

It can be seen from the above embodiment that with the embodiment of this disclosure, a case where beam failure occurs in the coordination network equipment may be dealt with efficiently, and normal communications between the network equipment and the user equipment may be ensured.

Embodiment 15

The embodiment of this disclosure provides a communications system, including network equipment and user equipment, the network equipment including the apparatus described in at least one of embodiments 10-13.

For example, a structure of the communications system may be as shown in FIG. 1. As shown in FIG. 1, for the user equipment 104, the communications system 100 includes serving network equipment 101 and coordination network equipment 102 and 103, the serving network equipment 101 including at least one of the apparatus for configuring a transmission resource of a beam failure recovery request described in Embodiment 10, the apparatus for processing beam failure described in Embodiment 12 and the apparatus for responding a beam failure recovery request described in Embodiment 13, and the coordination network equipment 102 and 103 including at least one of the apparatus for configuring a transmission resource of a beam failure recovery request described in Embodiment 10, the apparatus for processing beam failure described in Embodiment 11 and the apparatus for responding a beam failure recovery request described in Embodiment 13, which shall not be described herein any further.

It can be seen from the above embodiment that with the embodiment of this disclosure, a case where beam failure occurs in the coordination network equipment may be dealt with efficiently, and normal communications between the network equipment and the user equipment may be ensured.

The above apparatuses and methods of this disclosure may be implemented by hardware, or by hardware in combination with software. The present disclosure relates to such a computer-readable program that when the program is executed by a logic device, the logic device is enabled to carry out the apparatus or components as described above, or to carry out the methods or steps as described above. The present disclosure also relates to a storage medium for storing the above program, such as a hard disk, a floppy disk, a CD, a DVD, and a flash memory, etc.

The methods/apparatuses described with reference to the embodiments of this disclosure may be directly embodied as hardware, software modules executed by a processor, or a combination thereof. For example, one or more functional block diagrams and/or one or more combinations of the functional block diagrams shown in FIGS. 11-14 may either correspond to software modules of procedures of a computer program, or correspond to hardware modules. Such software modules may respectively correspond to the steps shown in FIGS. 2, 5, 6 and 8. And the hardware module, for example, may be carried out by firming the soft modules by using a field programmable gate array (FPGA).

The soft modules may be located in an RAM, a flash memory, an ROM, an EPROM, and EEPROM, a register, a hard disc, a floppy disc, a CD-ROM, or any memory medium in other forms known in the art. A memory medium may be coupled to a processor, so that the processor may be able to read information from the memory medium, and write information into the memory medium; or the memory medium may be a component of the processor. The processor and the memory medium may be located in an ASIC. The soft modules may be stored in a memory of a mobile terminal, and may also be stored in a memory card of a pluggable mobile terminal. For example, if equipment (such as a mobile terminal) employs an MEGA-SIM card of a relatively large capacity or a flash memory device of a large capacity, the soft modules may be stored in the MEGA-SIM card or the flash memory device of a large capacity.

One or more functional blocks and/or one or more combinations of the functional blocks in the drawings may be realized as a universal processor, a digital signal processor (DSP), an application-specific integrated circuit (ASIC), a field programmable gate array (FPGA) or other programmable logic devices, discrete gate or transistor logic devices, discrete hardware component or any appropriate combinations thereof carrying out the functions described in this application. And the one or more functional block diagrams and/or one or more combinations of the functional block diagrams in the drawings may also be realized as a combination of computing equipment, such as a combination of a DSP and a microprocessor, multiple processors, one or more microprocessors in communications combination with a DSP, or any other such configuration.

This disclosure is described above with reference to particular embodiments. However, it should be understood by those skilled in the art that such a description is illustrative only, and not intended to limit the protection scope of the present disclosure. Various variants and modifications may be made by those skilled in the art according to the principle of the present disclosure, and such variants and modifications fall within the scope of the present disclosure.

For implementations of this disclosure containing the above embodiments, following supplements are further disclosed.

Supplement 1. An apparatus for configuring a transmission resource of a beam failure recovery request, including:

a configuring unit configured to transmit configuration information to user equipment, the configuration information being used to configure a transmission resource of a beam failure recovery request related to coordination network equipment.

Supplement 2. The apparatus according to supplement 1, wherein the configuring unit includes:

a first configuring unit configured to transmit the configuration information via a system information block or remaining minimum system information of the coordination network equipment to the user equipment.

Supplement 3. The apparatus according to supplement 2, wherein the first configuring unit transmits the configuration information via the system information block or the remaining minimum system information of the coordination network equipment to user equipment establishing communications with the coordination network equipment and not connected to the coordination network equipment, or transmits the configuration information via the system information block or the remaining minimum system information of the coordination network equipment to user equipment establishing communications with the coordination network equipment and not connected to the coordination network equipment and user equipment connected to the coordination network equipment.

Supplement 4. The apparatus according to supplement 1, wherein the configuring unit includes:

a second configuring unit configured to transmit the configuration information via signaling of a radio resource control layer of serving network equipment to the user equipment.

Supplement 5. The apparatus according to supplement 4, wherein the second configuring unit transmits the configuration information via the signaling of the radio resource control layer of the serving network equipment to user equipment connected to the serving network equipment.

Supplement 6. The apparatus according to supplement 5, wherein, the configuration information includes transmission resource configuration of the beam failure recovery request when beam failures respectively occur in the serving network equipment and coordination network equipment of the user equipment connected to the serving network equipment.

Supplement 7. An apparatus for responding a beam failure recovery request, including:

a responding unit configured to transmit response information related to a beam failure recovery request of coordination network equipment to user equipment.

Supplement 8. The apparatus according to supplement 7, wherein the apparatus further includes:

a first receiving unit configured to receive a beam failure recovery request related to the coordination network equipment from the user equipment or serving network equipment.

Supplement 9. The apparatus according to supplement 8, wherein the responding unit includes:

a first responding unit configured to transmit the response information by transmitting a data channel to the user equipment.

Supplement 10. The apparatus according to supplement 9, wherein the apparatus further includes:

a transmitting unit configured to transmit a control channel used for scheduling the data channel to the user equipment.

Supplement 11. The apparatus according to supplement 8, wherein, the response information includes or does not include access-related information.

Supplement 12. The apparatus according to supplement 7, wherein the apparatus further includes:

a second receiving unit configured to receive a beam failure request related to the coordination network equipment from the user equipment or the coordination network equipment.

Supplement 13. The apparatus according to supplement 12, wherein, the response information includes at least one of cell ID information of the coordination network equipment where a beam failure event occurs, internal ID information of a coordination set of the coordination network equipment, global ID information of the coordination network equipment, beam pair link ID information of the coordination network equipment, and other related ID information of the coordination network equipment.

Supplement 14. The apparatus according to supplement 12, wherein the responding unit includes:

a second responding unit configured to transmit the response information to the user equipment via a data channel.

Supplement 15. The apparatus according to supplement 12, wherein the apparatus further includes:

a third receiving unit configured to receive part or all of information contained in the response information from the coordination network equipment.

Supplement 16. An apparatus for processing beam failure, including:

a first processing unit configured to abandon beam failure recovery, and transmit an event of beam failure and/or buffer remaining data to serving network equipment.

Supplement 17. An apparatus for processing beam failure, including:

a second processing unit configured to receive an event of beam failure and/or buffer remaining data from coordination network equipment, and transmit the buffer remaining data to user equipment when the buffer remaining data are received.

Supplement 18. A communications system, including network equipment and user equipment, the network equipment including the apparatus as described in any one of supplements 1-17.

Supplement 19. A method for configuring a transmission resource of a beam failure recovery request, including:

transmitting configuration information to user equipment, the configuration information being used to configure a transmission resource of a beam failure recovery request related to coordination network equipment.

Supplement 20. The method according to supplement 19, wherein the transmitting configuration information to user equipment, the configuration information being used to configure a transmission resource of a beam failure recovery request related to coordination network equipment, includes:

transmitting the configuration information via a system information block or remaining minimum system information of the coordination network equipment to the user equipment.

Supplement 21. The method according to supplement 20, wherein the transmitting the configuration information via a system information block or remaining minimum system information of the coordination network equipment to the user equipment includes: transmitting the configuration information via the system information block or the remaining minimum system information of the coordination network equipment to user equipment establishing communications with the coordination network equipment and not connected to the coordination network equipment, or transmits the configuration information via the system information block or the remaining minimum system information of the coordination network equipment to user equipment establishing communications with the coordination network equipment and not connected to the coordination network equipment and user equipment connected to the coordination network equipment.

Supplement 22. The method according to supplement 19, wherein the transmitting configuration information to user equipment, the configuration information being used to configure a transmission resource of a beam failure recovery request related to coordination network equipment, includes:

transmitting the configuration information via signaling of a radio resource control layer of serving network equipment to the user equipment.

Supplement 23. The method according to supplement 22, wherein the transmitting the configuration information via signaling of a radio resource control layer of serving network equipment to the user equipment includes:

transmitting the configuration information via the signaling of the radio resource control layer of the serving network equipment to user equipment connected to the serving network equipment.

Supplement 24. The method according to supplement 23, wherein, the configuration information includes transmission resource configuration of the beam failure recovery request when beam failures respectively occur in the serving network equipment and coordination network equipment of the user equipment connected to the serving network equipment.

Supplement 25. A method for responding a beam failure recovery request, including:

transmitting response information related to a beam failure recovery request of coordination network equipment to user equipment.

Supplement 26. The method according to supplement 25, wherein the method further includes:

receiving a beam failure recovery request related to the coordination network equipment from the user equipment or serving network equipment.

Supplement 27. The method according to supplement 26, wherein the transmitting response information related to a beam failure recovery request of coordination network equipment to user equipment includes:

transmitting the response information by transmitting a data channel to the user equipment.

Supplement 28. The method according to supplement 27, wherein the method further includes:

transmitting a control channel used for scheduling the data channel to the user equipment.

Supplement 29. The method according to supplement 26, wherein, the response information includes or does not include access-related information.

Supplement 30. The method according to supplement 25, wherein the method further includes:

receiving a beam failure request related to the coordination network equipment from the user equipment or the coordination network equipment.

Supplement 31. The method according to supplement 30, wherein, the response information includes at least one of cell ID information of the coordination network equipment where a beam failure event occurs, internal ID information of a coordination set of the coordination network equipment, global ID information of the coordination network equipment, beam pair link ID information of the coordination network equipment, and other related ID information of the coordination network equipment.

Supplement 32. The method according to supplement 30, wherein the transmitting response information related to a beam failure recovery request of coordination network equipment to user equipment includes:

transmitting the response information to the user equipment via a data channel.

Supplement 33. The method according to supplement 30, wherein the method further includes:

receiving part or all of information contained in the response information from the coordination network equipment.

Supplement 34. A method for processing beam failure, including:

abandoning beam failure recovery, and transmitting an event of beam failure and/or buffer remaining data to serving network equipment.

Supplement 35. A method for processing beam failure, including:

receiving an event of beam failure and/or buffer remaining data from coordination network equipment, and transmitting the buffer remaining data to user equipment when the buffer remaining data are received.

What is claimed is:

1. An apparatus for configuring a transmission resource of a beam failure recovery request, comprising:
 a memory that stores a plurality of instructions;
 processor circuitry that couples to the memory and is configured to execute the instructions to:
 transmit configuration information to user equipment, the configuration information being used to configure a transmission resource of a beam failure recovery request related to coordination network equipment,
 wherein a serving network equipment transmits at least one of:
 cell ID information of the coordination network equipment;
 internal ID information of a coordination set of the coordination network equipment;
 global ID information of the coordination network equipment; and
 other related ID information of the coordination network equipment to the user equipment.

2. The apparatus according to claim 1, wherein the processor circuitry is further configured to:
 transmit the configuration information via a system information block or remaining minimum system information of the coordination network equipment to the user equipment.

3. The apparatus according to claim 2, wherein the processor circuitry is further configured to:
 transmit the configuration information via the system information block or the remaining minimum system information of the coordination network equipment to:
 user equipment establishing communications with the coordination network equipment and not connected to the coordination network equipment, or
 transmit the configuration information via the system information block or the remaining minimum system information of the coordination network equipment to:

a first user equipment establishing communications with the coordination network equipment and not connected to the coordination network equipment; and a second user equipment connected to the coordination network equipment.

4. The apparatus according to claim 1, wherein the processor circuitry is further configured to:

transmit the configuration information via signaling of a radio resource control layer of serving network equipment to the user equipment.

5. The apparatus according to claim 4, wherein the processor is further configured to:

transmit the configuration information via the signaling of the radio resource control layer of the serving network equipment to user equipment connected to the serving network equipment.

6. The apparatus according to claim 5, wherein, the configuration information comprises transmission resource configuration of the beam failure recovery request when beam failures occur in the serving network equipment or coordination network equipment of the user equipment connected to the serving network equipment.

7. A communications system, comprising network equipment and user equipment, the network equipment comprising an apparatus for configuring a transmission resource of a beam failure recovery request, the apparatus comprising:

a memory that stores a plurality of instructions;

processor circuitry that couples to the memory and is configured to execute the instructions to:

transmit configuration information to user equipment, the configuration information being used to configure a transmission resource of a beam failure recovery request related to coordination network equipment, wherein a serving network equipment transmits at least one of:

cell ID information of the coordination network equipment;

internal ID information of a coordination set of the coordination network equipment;

global ID information of the coordination network equipment; and other related ID information of the coordination network equipment to the user equipment.

* * * * *